(12) United States Patent
Uehara (10) Patent No.: US 8,100,468 B2
(45) Date of Patent: Jan. 24, 2012

(54) CONNECTING STRUCTURE OF RESIN PANEL AND STIFFENER FOR VEHICLE

(75) Inventor: Tatsuaki Uehara, Tochigi (JP)

(73) Assignee: Yachiyo Industry Co., Ltd., Sayama-shi, Saitama (JP)

( * ) Notice: Subject to any disclaimer, the term of this patent is extended or adjusted under 35 U.S.C. 154(b) by 0 days.

(21) Appl. No.: 12/957,747

(22) Filed: Dec. 1, 2010

(65) Prior Publication Data

US 2011/0127809 A1 Jun. 2, 2011

(30) Foreign Application Priority Data

Dec. 2, 2009 (JP) ................................. 2009-274039

(51) Int. Cl.
*B60J 7/00* (2006.01)
(52) U.S. Cl. .................................................. 296/216.09
(58) Field of Classification Search .. 296/216.06–21.09, 296/201, 146.15, 84.1, 96.21; 49/498.1
See application file for complete search history.

(56) References Cited

U.S. PATENT DOCUMENTS 5,577,798 A * 11/1996 Ichinohe et al. ......... 296/216.09
7,048,327 B2 * 5/2006 Mack et al. .................... 296/213

FOREIGN PATENT DOCUMENTS

| JP | 11-034667 A | 2/1999 |
| JP | 2001-206064 A | 7/2001 |
| JP | 2003-211967 A | 7/2003 |

* cited by examiner

*Primary Examiner* — Dennis Pedder
(74) *Attorney, Agent, or Firm* — Squire, Sanders & Dempsey (US) LLP (57) ABSTRACT

A connecting structure of a resin panel and a stiffener for a vehicle, including the resin panel, a resin frame attached to a circumference of the resin panel; a weather strip attached to the frame; a metallic stiffener which is provided at the vicinity of the circumference of the resin panel; wherein the frame includes an extended part which extends outside of a side of the resin panel and the weather strip and the stiffener are integrally connected such that the weather strip and the stiffener sandwich the extended part, and wherein the frame is moved against a pinching force of the weather strip and the stiffener when the resin panel is deformed by a thermal expansion/contraction.

6 Claims, 6 Drawing Sheets

CONNECTING STRUCTURE OF RESIN PANEL AND STIFFENER FOR VEHICLE

CROSS REFERENCE TO RELATED APPLICATIONS

This application claims the foreign priority benefit under 35 U.S.C. §119 of Japanese Patent Application No. 2009-274039 filed on Dec. 2, 2009, the disclosure of which is incorporated herein by reference.

BACKGROUND OF THE INVENTION

1. Field of the Invention

The present invention relates to a connecting structure of a resin panel and a stiffener for a vehicle.

2. Description of the Related Art

An example structure of a panel body of a sunroof apparatus for a vehicle is disclosed in Japanese Unexamined Patent Application Publication No. 2003-211967. Japanese Unexamined Patent Application Publication No. 2003-211967 discloses a technique in which a weather strip is attached through a frame to the circumference of a glass panel and a metallic supporting frame (stiffener) for mainly reinforcing the torsional rigidity of the glass panel is attached to the lower surface circumference of the glass panel by an adhesive agent.

The structure in which the metallic stiffener is attached to the glass panel by an adhesive agent as disclosed in Japanese Unexamined Patent Application Publication No. 2003-211967 can be realized since the thermal expansion/contraction amount of the glass is not so different from that of the material of the stiffener. Therefore, it is difficult to use the structure if the panel is a resin panel because the thermal expansion/contraction amount of the resin is larger.

With regard to this problem, Japanese Unexamined Patent Application Publication No. 11-034667 and Japanese Unexamined Patent Application Publication No. 2001-206064 disclose a technique for accommodating the deformation amount of a resin panel caused by the thermal expansion/contraction. As a specific structure, Japanese Unexamined Patent Application Publication No. 11-034667 discloses a technique in which a coupling boss for fixing a stiffener is formed on the lower surface of the resin panel in a protruding shape and Japanese Unexamined Patent Application Publication No. 2001-206064 discloses a technique in which a hole through which a nut for fastening a stiffener is inserted is formed on the resin panel.

A resin panel has an excellent formability compared with a glass panel. However, in the technique in which the protruding portion or the hole is formed on the plate shape resin panel as disclosed in Japanese Unexamined Patent Application Publication No. 11-034667 and Japanese Unexamined Patent Application Publication No. 2001-206064, there are problems that sinks may be formed around the protruding portion or the hole and a mold of the resin panel tends to have a complicated structure.

SUMMARY OF THE INVENTION

The present invention is made in view of the above problems, and an object thereof is to provide a connecting structure of a resin panel and a stiffener for a vehicle that can accommodate deformation of the resin panel caused by the thermal expansion/contraction without providing the protruding portion or the hole in the resin panel.

A first aspect of the present invention provides a connecting structure of a resin panel and a stiffener in a vehicle panel body, the vehicle panel body including the resin panel; a resin frame attached to a circumference of the resin panel; a weather strip attached to the frame; a metallic stiffener which is provided at the vicinity of the circumference of the resin panel; wherein the frame includes an extended part which extends outside of a side of the resin panel and the weather strip and the stiffener are integrally connected such that the weather strip and the stiffener sandwich the extended part, and wherein the frame is moved against a pinching force of the weather strip and the stiffener when the resin panel is deformed by a thermal expansion/contraction.

In the aforementioned connecting structure, the weather strip and the stiffener may be connected by a connecting member, and a guide cylinder through which the connecting member is inserted so that the guide cylinder is sandwiched by the weather strip and the stiffener may be erected on the extended part of the frame.

The aforementioned connecting structure may further include a nut which is attached to the weather strip and is inserted through the guide cylinder as the connecting member, wherein the guide cylinder is sandwiched by the weather strip and the stiffener by fastening the stiffener to the nut with a bolt.

In the aforementioned connecting structure, the resin panel may be a sunroof panel attached to a fixed roof of the vehicle.

Figure 1:
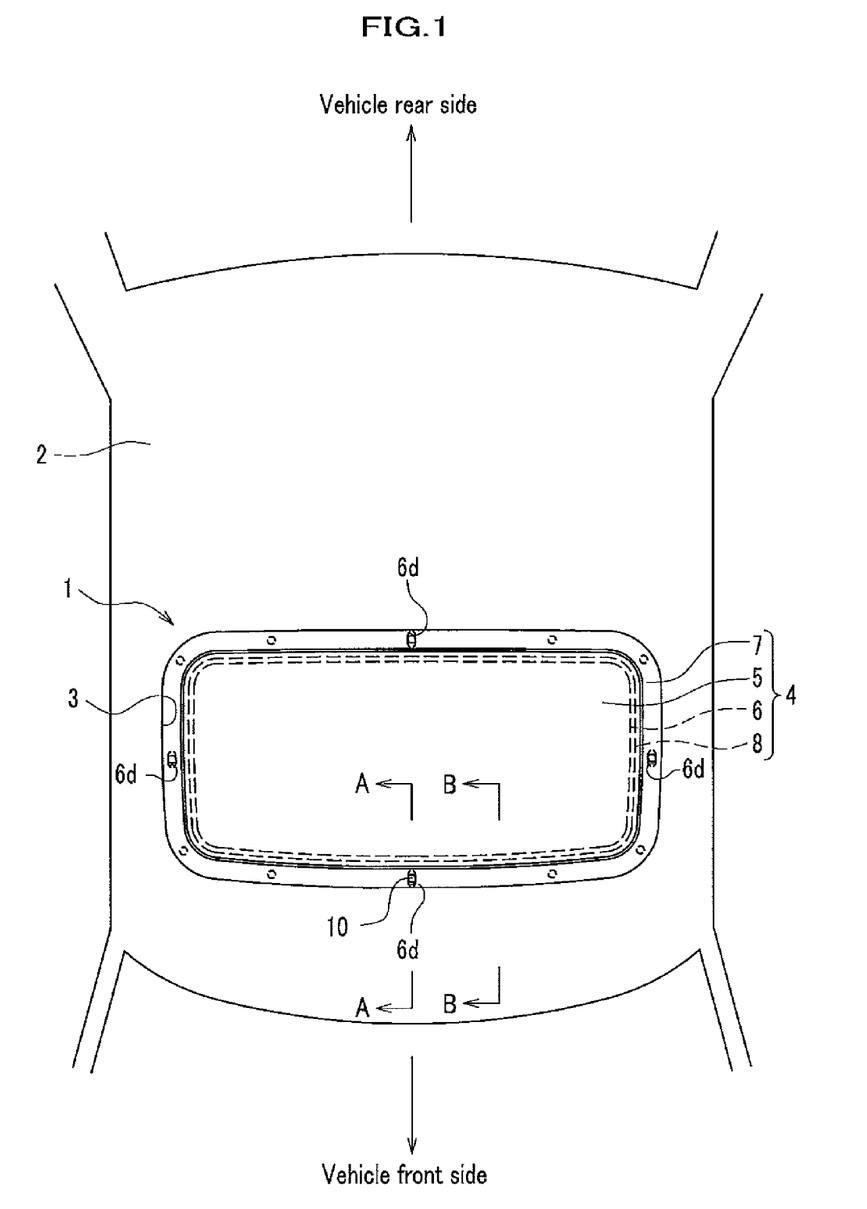
FIG. 1 is a plain view of a sunroof apparatus to which the present invention is applied.

An embodiment is described in which the present invention is applied to a sunroof apparatus. As shown in FIG. 1, a sunroof apparatus 1 includes an opening/closing panel body 4 attached to an opening 3 of a fixed roof 2 of a vehicle. When the penal body 4 is opened, for example, the panel body 4 is tilted up or tilted down to be slid backward.

DETAILED DESCRIPTION OF THE PREFERRED EMBODIMENT

Figure 2:
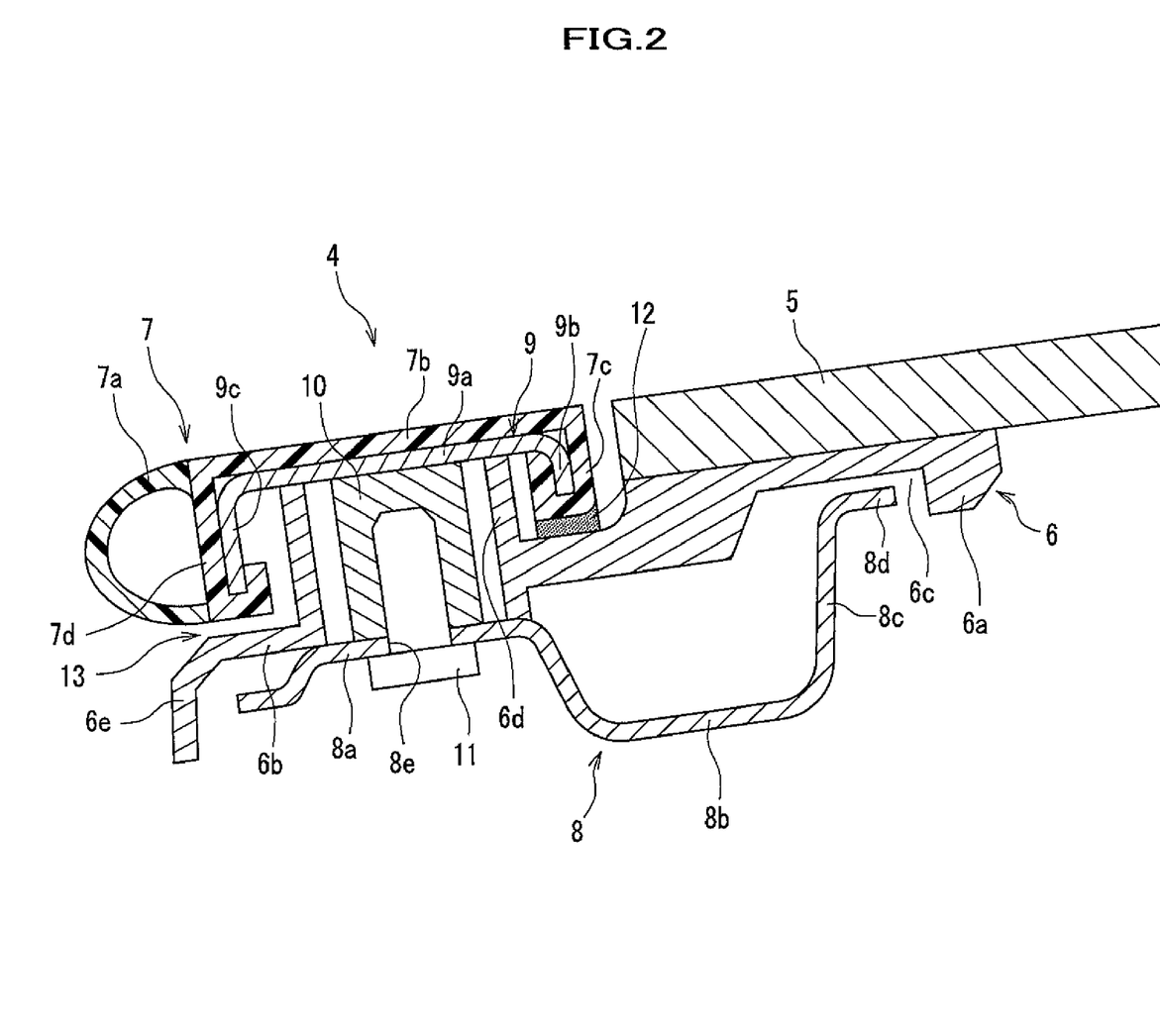
FIG. 2 is a cross sectional view taken along A-A line in FIG. 1.
Figure 3:
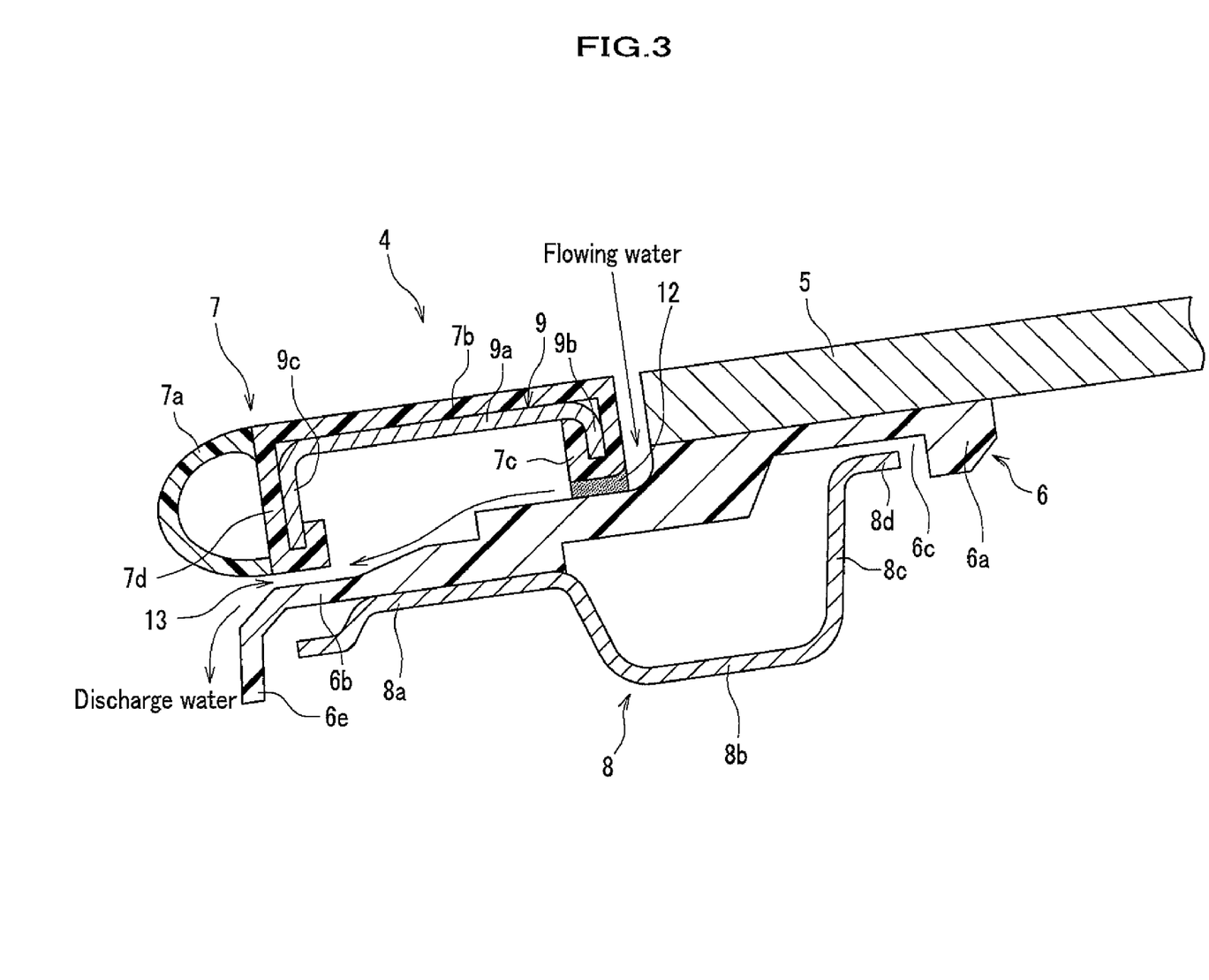
FIG. 3 is a cross sectional view taken along B-B line in FIG. 1.
Figure 4:
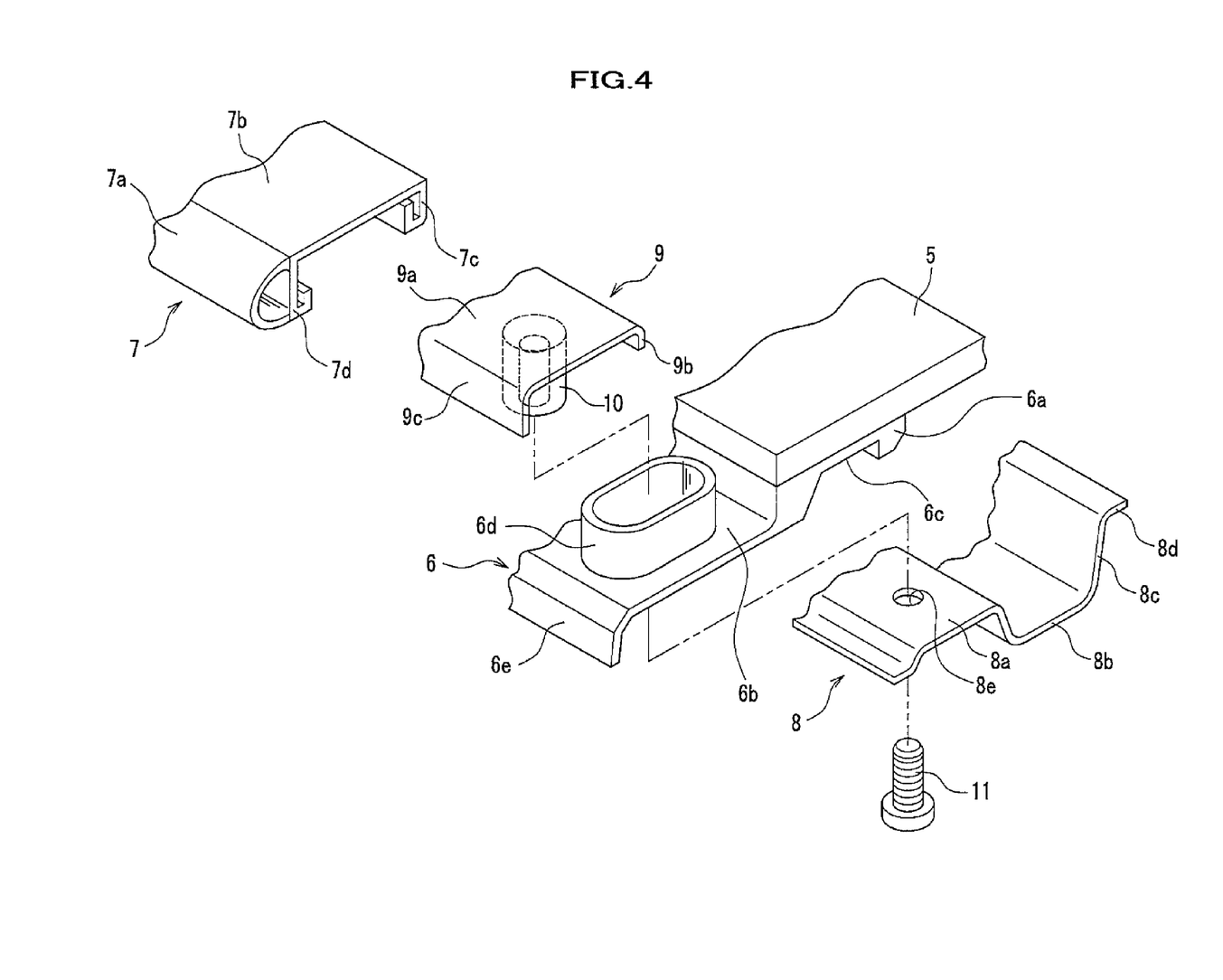
FIG. 4 is an exploded perspective view of a connecting structure of a resin panel and a stiffener according to the present invention.

As shown in FIGS. 2 to 4, the panel body 4 includes a resin panel 5, a resin frame 6 attached to the periphery of the lower surface of the resin panel 5, a weather strip 7 provided to the frame 6 and a metal stiffener 8 provided in the vicinity of the periphery of the lower surface of the resin panel 5. The frame 6, the weather strip 7 and the stiffener 8 are all provided along the entire periphery of the resin panel 5.

The resin panel 5 is made of a flat plate member of a substantially rectangular shape having a gently curved surface which conforms to the shape of the fixed roof 2. The resin panel 5 is formed of a transparent resin material such as acrylic or polycarbonate and enables to reduce the weight of the sunroof apparatus compared with a glass panel.

The frame 6 is integrally formed with the periphery of the lower surface of the resin panel 5 by a two-color molding, for example. The two-color molding is carried out by an injection molding, for example. If the material of the resin panel 5 is polycarbonate, the material of the frame 6 may be a material that can be fused to polycarbonate, such as polycarbonate ABS, polycarbonate PBT or the like. The resin panel 5 and the frame 6 may be integrally formed by an outsert molding in which an adhesive agent (primer) is used between the interfaces of the resin panel 5 and the frame 6.

The frame 6 is formed in a shape including a fixed part 6a which is integrally provided to the periphery of the lower surface of the resin panel 5 and an extended part 6b which is integrally formed with the fixed part 6a and extends outside of a side of the resin panel 5 from the fixed part 6a. Formed on the lower surface of the fixed part 6a is a recessed part 6c which is formed along the periphery of the resin panel 5 and opens downward. Further, a guide cylinder 6d into which a stud nut 10 (described later) can be inserted from the upper side of the guide cylinder 6d is erected on the upper surface of the extended part 6b. The guide cylinder 6d does not have a lid nor a bottom, and the bottom opening of the guide cylinder 6d opens on the lower surface of the extended part 6b. The plane cross sectional shape of the guide cylinder 6d is a long hole which is elongated in a direction perpendicular to the circumferential direction of the resin panel 5 so that the stud nut 10 can be relatively moved. A plurality of the guide cylinders 6d is provided along the circumference of the resin panel 5 with an interval provided between each of the guide cylinders 6d. As shown in FIG. 2, a drainage guide part 6e inclined downward is formed at an outer end of the extended part 6b of the frame 6 located below a sealing part 7a of the weather strip 7.

The weather strip 7 disposed at an upper side and the stiffener 8 disposed at a lower side are integrally connected such that the weather strip 7 and the stiffener 8 sandwich the extended part 6b of the frame 6 described above, or more specifically, the guide cylinder 6d. The weather strip 7 includes a hollow sealing part 7a which flexibly comes in contact with an edge of the opening 3 of the fixed roof 2 and functions as a water-proof seal when the panel body 4 is closed and a connecting part 7b which is disposed between the sealing part 7a and the resin panel 5 and is connected to the stiffener 8. Although there is a gap between the connecting part 7b and the resin panel 5 depending on a temperature condition as described later, the upper surfaces of the connecting part 7b and the resin panel 5 are formed to be flush as a so-called flush surface. As to a material of the weather strip 7, the sealing part 7a is formed of a flexible synthetic rubber member, and the material of the connecting part 7b is harder than that of the sealing part 7a in the embodiment. The sealing part 7a and the connecting part 7b are integrally formed, for example, by a two-color molding. In some cases, the sealing part 7a and the connecting part 7b may be formed of the same material.

A metallic holder plate 9 is integrally attached to the lower part of the connecting part 7b of the weather strip 7. The holder plate 9 is a member provided along the entire circumference of the resin panel 5 and is formed, for example, of a metal plated steel plate for preventing rust. The holder plate 9 is formed to be a shape including a web 9a formed substantially along the surface direction of the resin panel 5 in a side cross sectional view and flanges 9b, 9c which are bent at substantially right angle from both ends of the web 9a and extend downward. The flange 9b which is located closer to the resin panel 5 is formed shorter than the flange 9c.

The connecting part 7b of the weather strip 7 is formed such that the connecting part 7b covers the outer surface of the web 9a. The part of the connecting part 7b which covers the outer surface (upper surface) of the web 9a corresponds to the part which is flush with the upper surface of the resin panel 5. End portions 7c, 7d of the connecting part 7b are formed such that the end portions 7c, 7d surround the lower ends of the flanges 9b, 9c, respectively. Further, a sealing member 12 is integrally provided to the lower end of the end portion 7c located closer to the resin panel 5 by a two-color molding, for example. The sealing member 12 is formed of a highly flexible sponge-like member, for example. The cylindrical stud nut 10 including a female screw screwed on the inner periphery of the cylindrical stud nut 10 is fixed on the inner surface (lower surface) of the web 9a of the holder plate 9 by welding or the like.

The stiffener 8 is formed of a metal plate (e.g. a steel plate) which is bent to obtain a high rigidity. The stiffener 8 is formed in a shape including a connecting plate member 8a which is arranged in contact with the lower surface of the extended part 6b of the frame 6 and a groove-shape part 8b which is bent downward in substantially a U shape from an end of the connecting plate member 8a that is closer to the resin panel 5. A side wall 8c located closer to the resin panel 5 among the opposite side walls of the groove-shape part 8b rises up higher than the height position of the connecting plate member 8a. Formed at an upper end of the side wall 8c is a flange part 8d which extends toward the inner side of the resin panel 5.

A method for connecting the weather strip 7 and the stiffener 8 to the frame 6 includes inserting the stud nut 10 which is integrated through the holder 9 with the weather strip 7 into the guide cylinder 6d from the upper side of the guide cylinder 6d, arranging the connecting plate member 8a of the stiffener 8 to be in contact with the lower surface of the extended part 6b and inserting a bolt 11 through a bolt insertion hole 8e from the lower side of the connecting plate member 8a to threadedly engage the bolt 11 with the stud nut 10. In accordance with the method, the weather strip 7 and the stiffener 8 are integrally connected with each other by the connecting member made of the stud nut 10 and the bolt 11. By the fastening force of the bolt 11, the upper end edge of the guide cylinder 6d of the frame 6 comes in press contact with the weather strip 7 (more specifically, the web 9a of the holder plate 9) and the lower end edge thereof is in press contact with the connecting member 8a of the stiffener 8.

When the weather strip 7 and the stiffener 8 are connected, the flange part 8d of the stiffener 8 is positioned in the recessed part 6c of the frame 6. Further, the sealing member 12 attached to the end portion 7c of the connecting part 7b of the weather strip 7 comes in contact with the upper surface of the extended part 6b of the frame 6, and at the end portion 7d a gap 13 is formed between the upper surface of the extended part 6b and the end portion 7d. The gap 13 is provided over the whole circumference of the panel body 4, for example.

As described above, although the stiffener 8 is not a member which is directly fixed to the resin panel 5, the stiffener 8 is provided along the circumference of the resin panel 5 through the frame 6 as a rigid member which is integrated with the resin panel 5. Thus, the stiffener 8 fully functions as a stiffener for enhancing the torsional rigidity of the resin panel 5.

<Effect>

Figure 5A:
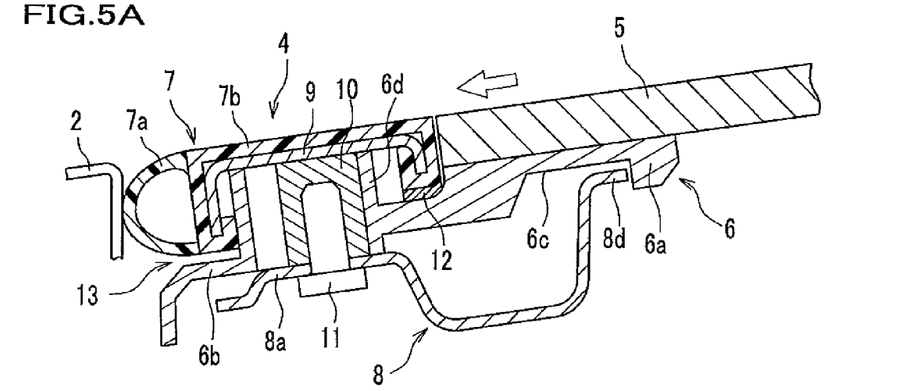
FIG. 5 is a side view of the sunroof apparatus explaining an effect of the present invention.
Figure 5B:
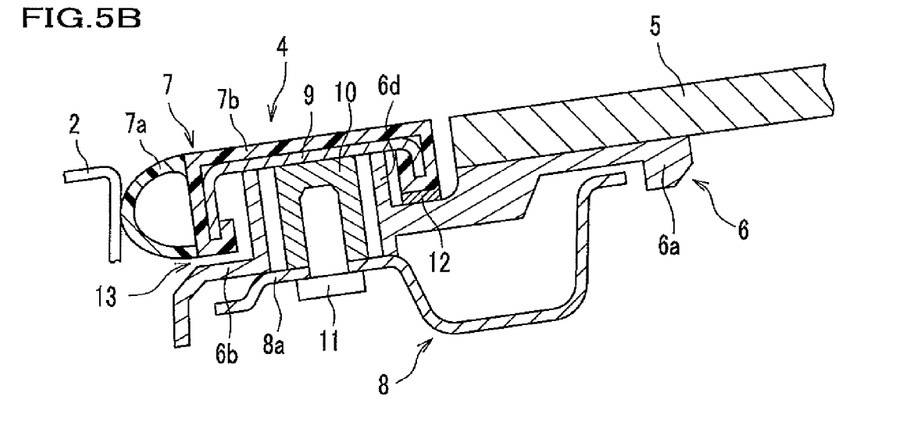
Figure 5C:
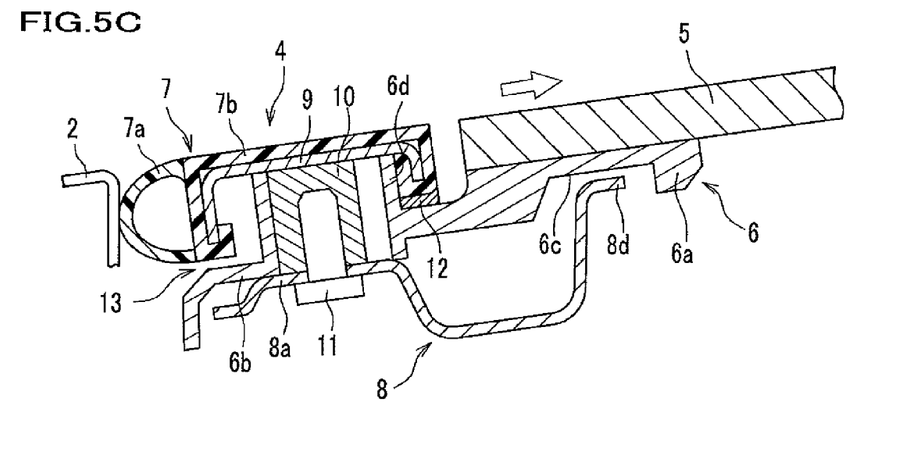

The effect of the present invention is described with reference to FIGS. 5A to 5C. FIGS. 5A to 5C show a status where the panel body 4 is closed in the fixed roof 2. FIG. 5B show a status of the panel body 4 at normal temperature in which the stud nut 10 is located in the vicinity of the center of the guide cylinder 6d in the longitudinal direction of the guide cylinder 6d and a predetermined length of gap is formed between the weather strip 7 and the end surface of the resin panel 5. It is to be noted that the gap is shown a little larger for the convenience of the explanation of the effect of the present invention.

At a high ambient temperature, the extended part 6b of the frame 6 is moved relative to the weather strip 7 and the stiffener 8 toward the edge of the fixed roof 2 against the pinching force of the weather strip 7 and the stiffener 8, or more specifically the fastening force of the bolt 11 to the stud nut 10 since the resin panel 5 and the resin frame 6 having a higher thermal expansion/contraction rate compared with the metallic stiffener 8 are expanded. The stud nut 10 is relatively moved in the guide cylinder 6d to an end of the guide cylinder 6d which is closer to the resin panel 5, which makes the gap between the weather strip 7 and the end surface of the resin panel 5 shorter. Thus, the pinching force of the weather strip 7 and the stiffener 8 sandwiching the extended part 6b of the frame 6 (i.e. the fastening force of the bolt 11 and the stud nut 10) is set to be in a range where the lateral movement of the extended part 6b caused by the thermal expansion/contraction of the resin panel 5 is allowed. The pinching force is managed and set by a torque wrench, for example.

In contrast, at a low ambient temperature, the extended part 6b of the frame 6 is moved relative to the weather strip 7 and the stiffener 8 away from an edge of the fixed roof 2 against the pinching force of the weather strip 7 and the stiffener 8, or more specifically, the fastening force of the bolt 11 and the stud nut 10 since the resin panel 5 and the resin frame 6 having the higher thermal expansion/contraction rate compared with the metallic stiffener 8 are contracted. The stud nut 10 is relatively moved in the guide cylinder 6d to an end of the guide cylinder 6d closer to the edge of the fixed roof 2, which makes the gap between the weather strip 7 and the resin panel 5 larger.

As described above, with a structure in which the resin frame 6 is integrally attached to the circumference of the resin panel 5, the weather strip 7 and the stiffener 8 are integrally connected with each other such that the weather strip 7 and the stiffener 8 sandwich the extended part 6b of the frame 6, and the frame 6 is moved relative to the weather strip 7 and the stiffener 8 against the pinching force of the weather strip 7 and the stiffener 8 when the resin panel 5 is deformed by a thermal expansion/contraction, it is possible to accommodate the deformation of the resin panel 5 caused by the thermal expansion/contraction without providing protruding portions or holes to the resin panel 5 as in the case of Japanese Unexamined Patent Application Publication No. 11-034667 and Japanese Unexamined Patent Application Publication No. 2001-206064. Thus, the problem of sinks which may be generated by providing the protruding portions or holes to the resin panel 5 will not occur. As to the mold of the resin panel 5, the mold of the resin panel 5 can be a simple structure which only produces a plate-shape panel without a protruding portion or a hole.

In the structure where the weather strip 7 and the stiffener 8 are connected by the connecting member (the stud nut 10 and the bolt 11) and the guide cylinder 6d through which the connecting member (the stud nut 10 and the bolt 11) is inserted so that the guide cylinder 6d is sandwiched by the weather strip 7 and the stiffener 8 is erected on the extended part 6b of the frame 6, the guide cylinder 6d includes both functions of guiding the relative movement of the connecting member and of being sandwiched by the weather strip 7 and the stiffener 8, which realizes a simple connecting structure of the resin panel 5 and the stiffener 8 which has an excellent assemblability.

Further, the structure in which the stiffener 8 is fastened to the stud nut 10 by the bolt 11 and the guide cylinder 6d is sandwiched by the weather strip 7 and the stiffener 8 can provide a connecting structure of the resin panel 5 and the stiffener 8 which requires fewer components and has an excellent assemblability.

Water seeping from the gap between the weather strip 7 and the end surface of the resin panel 5 is firstly stopped by the sealing member 12 as shown in FIG. 3. Water which has passed the sealing member 12 flows on the extended part 6b of the frame 6 and drops downward from the gap 13 through the drainage guide part 6e.

Figure 6:
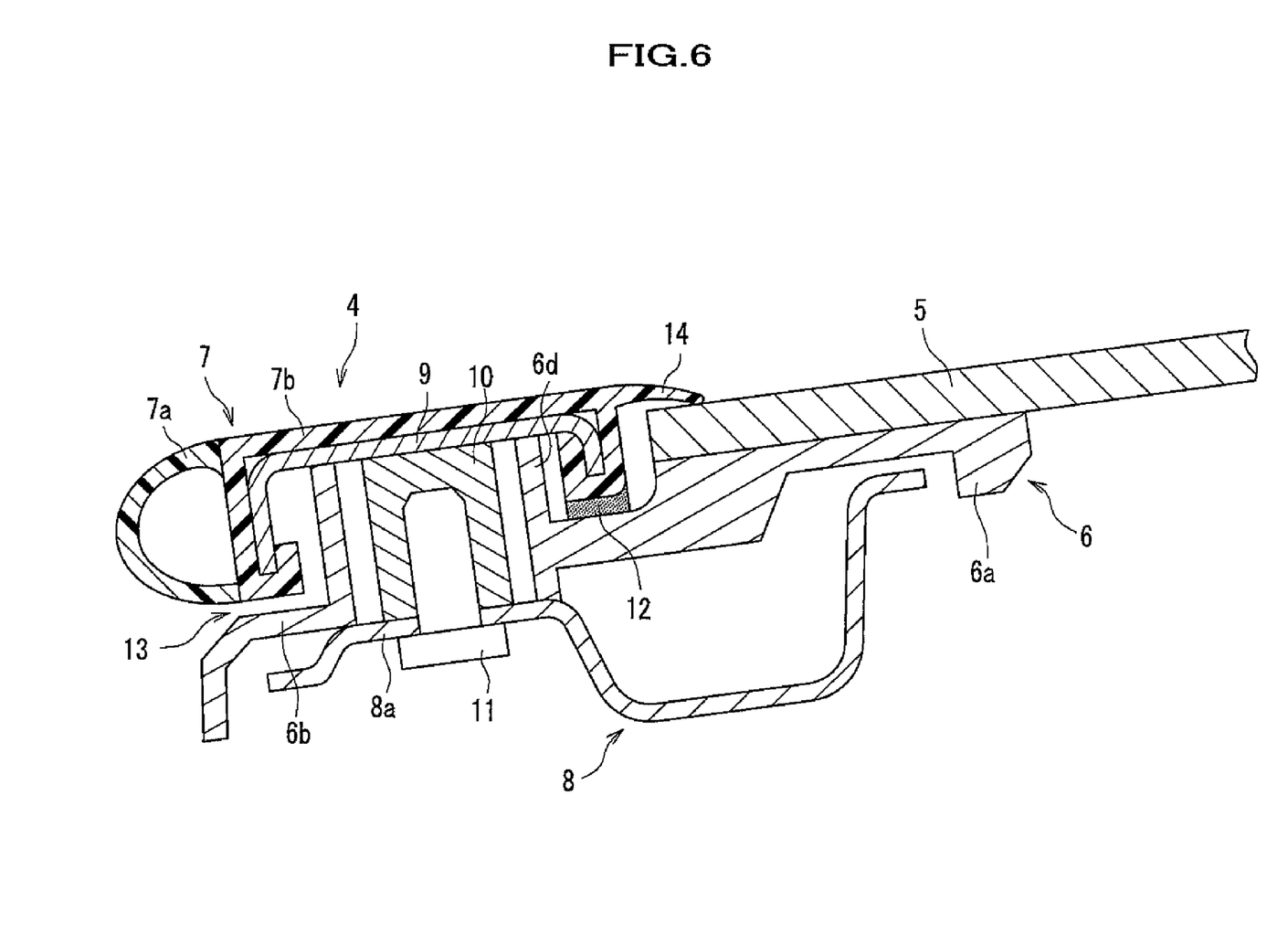
FIG. 6 is a cross sectional view showing an embodiment including a fin provided to a weather strip.

FIG. 6 shows an embodiment in which a fin 14 is provided to the weather strip 7 to prevent the ingress of water in the gap between the weather strip 7 and the end surface of the resin panel 5. The fin 14 has a lip shape in a cross section, and its base end is integrally formed with the inner edge of the connecting part 7b of the weather strip 7 and its distal end is disposed such that the distal end press contacts the upper surface circumferential edge of the resin panel 5, whereby the fin 14 covers the gap between the weather strip 7 and the end surface of the resin panel 5 around the entire circumference of the panel body 4. Thus, ingress of the water in the gap between the weather strip 7 and the end surface of the resin panel 5 can be prevented. It is to be noted that the fin 14 and the sealing member 12 shown in FIG. 2 may be used in combination.

A preferred embodiment of the present invention has been explained as above. In the explained embodiment, the panel body 4 is a sunroof panel, however, the panel body 4 is not limited to this. The present invention may be applied to a side window or a rear window of the vehicle as long as a panel body is the panel body 4 which includes "a resin panel, a resin frame attached to the circumference of the resin panel, a weather strip attached to this frame, a metal stiffener which is provided in the vicinity of the circumference of the resin panel".

I claim:

1. A connecting structure of a resin panel and a stiffener in a vehicle panel body, the vehicle panel body comprising:
    the resin panel;
    a resin frame attached to a circumference of the resin panel;
    a weather strip attached to the frame;
    a metallic stiffener which is provided at the vicinity of the circumference of the resin panel; wherein
    the frame includes an extended part which extends outside of a side of the resin panel and the weather strip and the stiffener are integrally connected such that the weather strip and the stiffener sandwich the extended part, and wherein
    the frame is moved against a pinching force of the weather strip and the stiffener when the resin panel is deformed by a thermal expansion/contraction.

2. The connecting structure of the resin panel and the stiffener according to claim 1, wherein the weather strip and the stiffener is connected by a connecting member, and a guide cylinder through which the connecting member is inserted so that the guide cylinder is sandwiched by the weather strip and the stiffener is erected on the extended part of the frame.

3. The connecting structure of the resin panel and the stiffener for the vehicle according to claim 2, further comprising a nut which is attached to the weather strip and is inserted through the guide cylinder as the connecting member; wherein the guide cylinder is sandwiched by the weather strip and the stiffener by fastening the stiffener to the nut with a bolt.

4. The connecting structure of the resin panel and the stiffener for the vehicle according to claim 1, wherein the resin panel is a sunroof panel attached to a fixed roof of the vehicle.

5. The connecting structure of the resin panel and the stiffener for the vehicle according to claim 2, wherein the resin panel is a sunroof panel attached to a fixed roof of the vehicle.

6. The connecting structure of the resin panel and the stiffener for the vehicle according to claim 3, wherein the resin panel is a sunroof panel attached to a fixed roof of the vehicle.

* * * * *